United States Patent [19]
Kolb et al.

[11] Patent Number: 6,015,365
[45] Date of Patent: Jan. 18, 2000

[54] ELECTRONIC GEAR SHIFT ASSIST CIRCUITRY

[75] Inventors: Richard P. Kolb, Prairie View; Robert P. Otka, Gurnee, both of Ill.

[73] Assignee: Outboard Marine Corporation, Waukegan, Ill.

[21] Appl. No.: 09/239,452

[22] Filed: Jan. 28, 1999

[51] Int. Cl.[7] .................................................. B60K 41/08
[52] U.S. Cl. ........................... 477/103; 477/101; 477/109
[58] Field of Search .................................... 477/101, 103, 477/107, 109

[56] References Cited

U.S. PATENT DOCUMENTS

| 3,898,894 | 8/1975 | Anono et al. ........................ 477/101 X |
| 4,270,414 | 6/1981 | Tellert ...................................... 477/103 |
| 4,488,455 | 12/1984 | Shetler et al. ....................... 477/101 X |
| 4,726,798 | 2/1988 | Davis .................................... 477/103 X |

*Primary Examiner*—Sherry L. Estremsky
*Attorney, Agent, or Firm*—Armstrong Teasdale LLP

[57] ABSTRACT

A shift-assist circuit for reducing the clutch wear of a transmission on a marine propulsion system during the shift process by anticipating the probable shifting forces and providing an ignition-kill signal before the shift forces can build to an unacceptable level.

14 Claims, 1 Drawing Sheet

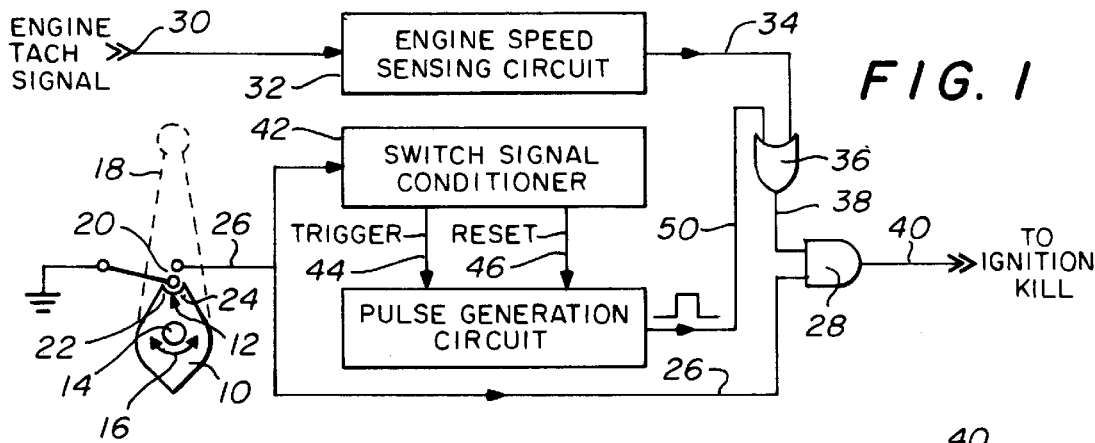
FIG. 1
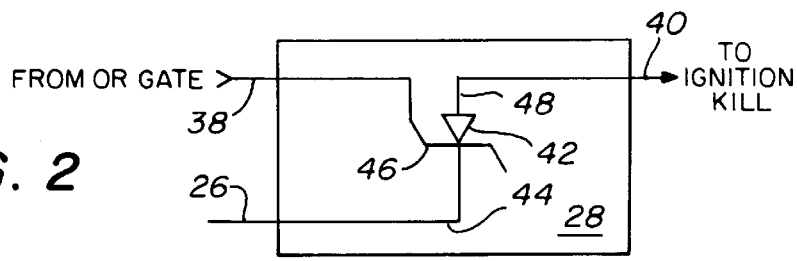
FIG. 2
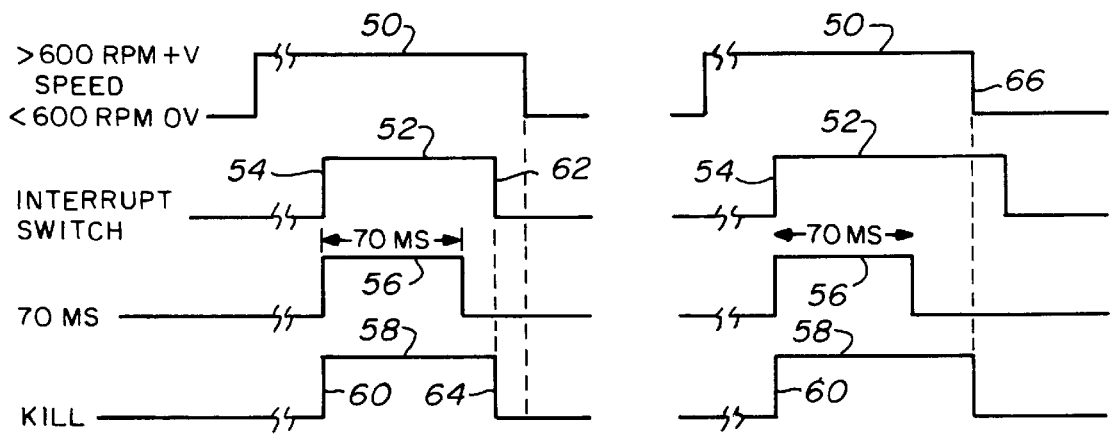
FIG. 3A
FIG. 3B
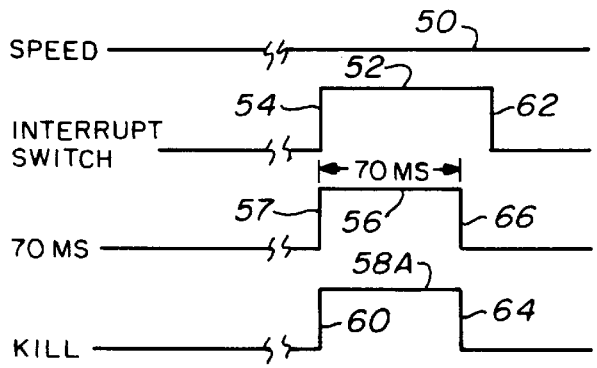
FIG. 4A
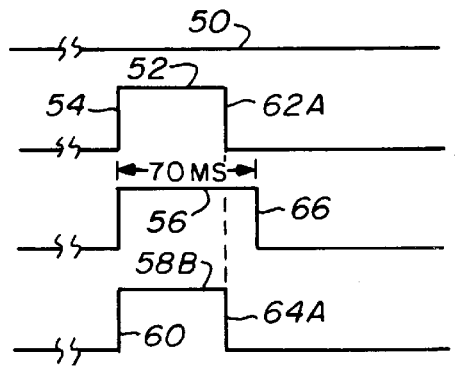
FIG. 4B

ELECTRONIC GEAR SHIFT ASSIST CIRCUITRY

BACKGROUND OF THE INVENTION

1. Field of the Invention

The present invention relates in general to gear-shifting apparatus for an internal combustion engine and more particularly to a electronic gear-shifting circuitry for use in a high horsepower marine propulsion system for reducing the effort required to move a shift lever between reverse and neutral and between forward and neutral.

2. Description of Related Art Including Information Disclosed Under 37 CFR 1.97 AND 1.98

It is well known in the art that the mechanical nature of the marine transmission used with higher horsepower marine propulsion systems, such as found in a typical outboard gear case, results in high forces when shifting the transmission out of gear under an applied drive torque. In general, the higher and smoother the applied torque, the greater the force required to shift the transmission from either reverse or forward to the neutral position. Previous systems have reduced the high shifting force necessary by reducing the applied torque to the clutch during the shifting process by killing or inhibiting the spark plug ignition. Typically in the prior art techniques a shift load activated switch simply shorts the ignition signal to ground (thereby killing the ignition). Typically with these systems, there is a noticeable time delay between the initial attempt to shift the gear and the reduction of torque such that the shifting forces are still relatively high. For example, in the prior art systems a shift force must first develop before the switch activates which, in turn, kills the ignition which, in turn, reduces the drive torque to allow clutch separation. Because of these time-sequenced events, there is, of course, a time delay which still allows significant shift forces to develop before the torque on the clutch is reduced.

It would be extremely advantageous to have a shift assist apparatus which could anticipate the upcoming shift forces or load and then proceed to reduce the drive torque load by killing the ignition before the shift load or forces at the control handle have an opportunity to build.

SUMMARY OF THE INVENTION

The present invention provides methods and apparatus for reducing the forces necessary to move a shift lever in a marine propulsion system by anticipating the upcoming shift load. This occurs by activating an interrupt switch with the initial movement of the shift lever which anticipates the upcoming shift load and works to reduce the drive torque by killing the ignition before the forces on the shift lever build to an excessive amount. The apparatus includes a shift link position cam which operates the interrupt switch or creates switch closure between both the forward-neutral linkage positions and the reverse-neutral linkage positions such that contact closure and ignition interrupt takes place with every shift out-of-gear. The systems has two modes of operation. The first mode is dependent upon engine speed being above a selected amount such as, for example, 600 RPM and closure of the interrupt switch.

The second operational mode of the circuitry generates a kill or spark-interrupt condition by triggering a 70 millisecond pulse signal in response to the interrupt switch closure. In this mode, there may be a kill period less than 70 milliseconds, but never more than 70 milliseconds.

Accordingly, it is a primary object of the present invention to reduce the shifting forces of a gear shift lever of the transmission of an internal combustion engine by killing the ignition or interrupting the spark circuitry of an engine.

It is another object of the present invention to reduce the forces necessary to shift to a neutral gear position by reducing the time necessary to shift out of gear.

It is still another object of the present invention to provide methods and apparatus to assist in the shifting of gears of a marine propulsion system so as to reduce the wear on the control handle mechanism, the shift cables, and shift linkages.

It is yet another object of the present invention to provide gear-shifting assist circuitry which minimizes the shock of shifting gears and allows for better initial clutch engagement such that less costly shift linkage mechanisms may be used.

Thus, the present invention relates to a shift assist circuit for reducing the torque to the clutch of a transmission during the shifting process and comprises an interrupt switch which is responsive to movement of the transmission shift lever for providing an interrupt signal. There is also included an engine speed sensing circuit which provides a speed threshold signal when the engine speed is above a selected speed, such as, for example, 600 RPM. The interrupt signal also initiates a pulse-generation circuit which provides a pulse signal having a fixed time period, such as, for example, 70 milliseconds in response to the interrupt signal. A combining circuit such as, for example, a silicone-controlled rectifier generates an ignition-kill circuit upon receiving both the interrupt signal and an arming signal which is representative of either of the speed threshold signal or the pulse signal.

According to one embodiment, the circuitry also receives a tachometer indicative of the engine speed and converts the tachometer signal or frequency to a voltage output when the tachometer signal is in excess of the selected speed.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which:

FIG. 1 is a block logic diagram showing the circuitry of the present invention;

FIG. 2 shows a circuit element suitable for use as the AND gate of the circuit shown in FIG. 1;

FIGS. 3A and 3B are timing diagrams of various signals produced by the circuitry of the present invention according to a first mode of operation; and FIGS. 4A and 4B are timing diagrams of signals produced by the circuitry of the present invention according to a second mode of operation.

DETAILED DESCRIPTION OF THE PREFERRED EMBODIMENT(S)

As shown in FIG. 1, there is a shift assist circuitry according to the teachings of the present invention. As shown, a cam member 10 includes a niche 12 representative of a neutral position. The cam member 10 rotates around a pivot 14 as indicated by the arcuate arrow 16. Cam 10 is moved in response to movement of a lever arm such as shown in dashed lines 18 as an example only. As is seen, the cam 10 operates to close an interrupt switch 20 whenever the cam is rotated around pivot 14 such that either cam lobe 22 or cam lobe 24 will close interrupt switch 20 when the cam is rotated out of the neutral position. Closure of interrupt switch 20 results in an interrupt signal being generated on line 26 which is connected to a combining circuit indicated in FIG. 1 as AND gate 28. Also as shown, the circuitry receives a tachometer signal from the engine on line 30 which is provided to an engine speed sensing circuit 32. Engine speed sensing circuit 32 receives the engine tach signal from line 30 and produces a speed threshold signal on line 34 whenever the engine tach signal indicates that the engine speed is above a selected value. According to one embodiment, the engine speed sensing circuit 32 is a frequency-to-voltage converter which produces a voltage output when the engine speed from the tachometer is indicated as being above 600 RPM and does not produce such a voltage output when the engine speed is below 600 RPM. The speed threshold signal generated by the engine speed sensing circuit 32 is provided along line 34 to one input of an OR gate 36. The output of the OR gate, hereinafter referred to as the "arm signal", is provided on line 38 to AND gate 28 Thus, it will be appreciated by those skilled in the art that the presence of an "arm signal" on line 38 and an interrupt signal on line 26 at AND gate 28 will result in the generation of an ignition kill system signal on line 40.

Also as shown, the interrupt signal on line 26 is also provided to a switch signal conditioning circuit 42 which receives the interrupt circuit and provides a trigger output on line 44 and a reset output on line 46. The signal conditioning circuit 42 operates such that the trigger signal is generated each time there is closure of the interrupt switch 20 by cam 10. When the interrupt switch opens by rotating the cam back to the neutral position, the reset signal is provided on line 46. Both the reset signal on line 46 and the trigger signal on line 44 are provided to a pulse-generation circuit 48 which generates an output pulse having a fixed time duration each time the trigger signal is received. According to one embodiment, a particularly satisfactory fixed time period is 70 milliseconds. Thus, upon closure of the interrupt switch 20, a pulse will be produced on line 50 with a fixed time period. Line 50 is then provided to the OR gate 36 as a second input. Thus, it will be seen that since an OR gate will pass any of its input signals, the arm signal on line 38 will be generated at any time the engine speed is above a selected speed or for a fixed period of time at any time there is interrupt switch closure.

Referring now to FIG. 2, there is shown a particularly suitable component for use as the AND gate 28. As shown, there is a silicone-controlled rectifier 42 wherein the interrupt signal on line 26 is connected to the cathode of the silicone-controlled rectifier 42 and the arm signal on line 38 from OR gate 36 is connected to the gate of the silicone-controlled rectifier 42. The anode of the silicone-controlled rectifier is connected to line 40 and provides the ignition kill signal.

FIGS. 3A and 3B show timing diagrams of the generation of various signals in the circuit of the present invention which occur when the circuit is operated in a first mode when the engine speed is greater than 600 RPM. As shown in FIG. 3A, at some point in time the engine speed will increase to a level higher than 600 RPM. At that point, the frequency-to-voltage converter 32 will produce a positive pulse as indicated by timing line 50. At some point in time after the engine has been running at greater than 600 RPM, the operator of the boat will choose to shift from a forward or reverse gear position to a neutral position as is indicated by graph 52 at rising edge 54. In the diagram as shown, the activation of the interrupt switch by movement of the shift lever has occurred while the speed is greater than 600 RPM. As also was discussed above, the interrupt signal also results in pulse-generating circuit 48 producing a 70-millisecond timing pulse as is indicated by graph 56. However, in this mode of operation, although the pulse signal is generated, as will be appreciated by review of the timing diagrams of the other signals, it has no effect in this operational mode. As shown, the ignition-kill signal 58 which occurred as an output from AND gate 28 on line 40 will occur substantially immediately upon receipt of the interrupt signal indicated by rising edge 54 of diagram 52. As shown, the rising edge 60 of the ignition-kill signal on graph 58 substantially coincides with the rise edge 54 of the interrupt switch and will only be delayed by the activation time of the electronic circuitry. In the diagram as shown, the interrupt switch will be de-activated and reset when interrupt switch 20 moves from the closed to the open position. This is indicated by the falling edge 62 of graph 52. As can be seen, the ignition-kill signal indicated by graph 58 will also be removed from the ignition circuitry at substantially the same time the interrupt switch is opened. Thus, the falling edge of the ignition-kill signal shown on line 58 at falling edge 64 occurs at substantially the same time as the falling edge 62 of the interrupt signal as indicated by time graph 52.

Referring now to FIG. 3B, there is described another sequence of operation in the first mode wherein the engine speed is initially above 600 RPM. Reference numerals in FIG. 3B will be the same as those used in FIG. 3A for portions of the timing diagrams which are the same. It is seen that the falling edge of timing diagram 52 occurs at a later time than in the diagram of FIG. 3A. As shown, the interrupt switch does not open again until after the speed of the engine has fallen below 600 RPM as indicated by falling edge 66 of graph 50. In this situation, the ignition-kill signal continues for a longer period of time and is not removed by the opening of the interrupt switch. As shown, the ignition-kill signal indicated by timing graph 58 is removed when the speed threshold signal 50 falls to zero as the speed of the engine drops below 600 RPM as indicated by reference numeral 66. Again it is noted that the pulse signal 56 has been generated and timed out before the speed drops off to less than 600 RPM so, again, it has no affect on the operation of the circuitry.

Referring now to FIGS. 4A and 4B, there are shown timing diagrams for the second mode of operation of the present invention. As shown in this example, the speed of the engine is never above 600 RPM. Therefore, the graph 50 remains at 0 volts and does not have an output. According to the mode illustrated by FIG. 4A, the interrupt switch is closed and the interrupt pulse 52 is again initiated as indicated by rising edge 54. However, in this example there is no speed threshold signal present at OR gate 36 and therefore the ignition-kill signal 58 cannot be immediately initiated. As discussed above, the interrupt signal is applied to the pulse-generation circuit and the 70-millisecond pulse, as indicated by graph 56 and having a rising edge 57, is generated. The rising edge 57 of pulse 56 occurs at essentially the same time as the rising edge 54 of the interrupt signal 52. The output of the pulse signal is provided to the OR gate 36 such that the arm signal 38 is provided to AND gate 28. Thus, the rising edge of kill signal 58A occurs essentially with the rising edge 54 of the interrupt signal and the rising edge 57 of the pulse signal 56. Also as shown, the fall-off edge 62 of the interrupt signal continues past the 70-millisecond time period and the fall-off edge 66 of the pulse signal. Thus the ignition-kill signal shown on time graph 58A continues until the fall off of the pulse signal 56 and consequently lasts for approximately 70 milliseconds. Thus, it will be appreciated in the mode described with respect to FIGS. 4A and 4B, the ignition-kill signal will not last longer than 70 milliseconds no matter the duration of the interrupt signal indicated by graph 52.

FIG. 4B shows timing diagrams wherein the shifting was completed rather rapidly after closure of the interrupt switch and in a time period less than the 70 milliseconds of the pulse signal. As shown, the timing diagrams of this figure are similar to those shown in FIG. 4A except that the falling edge 62A of the interrupt signal 52 occurs in less than 70 milliseconds and therefore occurs before the falling edge 66 of the timing signal indicated by graph 70. Thus, the ignition-kill signal indicated by graph 58B will also occur before the 70-millisecond pulse has timed out and will substantially be removed at the same time the interrupt switch is opened.

The corresponding structures, materials, acts, and equivalents of all means or step plus function elements in the claims below are intended to include any structure, material, or act for performing the function in combination with other claimed elements as specifically claimed.

We claim:

1. A shift-assist circuit for reducing the torque to the clutch of a transmission during the shift process comprising:
   an interrupt switch responsive to movement of a transmission shift lever for providing an interrupt signal;
   an engine speed sensing circuit for providing a speed threshold signal for indicating when the engine speed is above or below a selected speed;
   a pulse-generation circuit for providing a pulse signal having a fixed time period in response to receiving said interrupt signal; and
   a combining circuit for generating an ignition-kill signal upon receiving said interrupt signal and an arm signal representative of one of either said speed threshold signal and said pulse signal.

2. The circuit of claim 1 wherein said selected speed is greater than 600 RPM.

3. The circuit of claim 1 wherein said interrupt switch is activated or closed by a cam mechanism when said transmission shift lever is moved toward a neutral position.

4. The circuit of claim 1 and further comprising an OR gate for receiving said pulse signal and said speed threshold signal and generating said arm signal if either of said pulse signal and speed threshold signal are present.

5. The circuit of claim 1 wherein said combining circuit is a silicone-controlled rectifier having a gate, a cathode, and an anode, said gate connected to receive said arm signal, said cathode connected to receive said interrupt signal, and said anode providing said ignition-kill signal.

6. The circuit of claim 1 wherein said fixed time period is 70 milliseconds.

7. The circuit of claim 1 and further comprising a source for a tachometer signal indicative of the engine speed and wherein said engine speed sensing circuit is a frequency-to-voltage converter for receiving said tachometer signal and generating a voltage output when said tachometer signal is in excess of a selected speed.

8. The circuit of claim 7 wherein said selected speed is greater than 600 RPM and said fixed time period is 70 milliseconds and further comprising:
   a signal conditioning circuit for generating a reset signal and a trigger signal, said pulse-generating circuitry receiving said reset and trigger signals such that said pulse signal having said fixed time is generated with each activation of said interrupt switch; and
   an OR gate for receiving said pulse signal and said speed threshold signal and generating said arm signal if either of said pulse signal or said speed threshold signal is present.

9. The circuit of claim 1 and further comprising signal conditioning circuitry for generating a reset signal and a trigger signal and wherein said pulse-generation circuit receives said reset and trigger signals such that said pulse signal having a fixed time period is generated with each activation of said interrupt switch.

10. The circuit of claim 9 wherein said fixed time period is 70 milliseconds.

11. A method of reducing the torque applied to an engine transmission during the shift process comprising the steps of:
   generating an interrupt signal in response to movement of a transmission shift lever;
   providing a signal indicative of engine speed and generating a speed threshold signal when said engine speed is in excess of a selected speed;
   generating a pulse signal having a fixed time period in response to said interrupt signal; and
   generating an ignition-kill signal in response to the occurrence of said interrupt signal and one of said speed threshold signal or said pulse signal.

12. The method of claim 11 wherein said step of generating a pulse signal comprises the step of generating a pulse signal having a 70-millisecond time duration.

13. The method of claim 11 wherein said speed threshold signal is generated when said engine speed is greater than 600 RPM.

14. The method of claim 13 wherein said step for generating a pulse signal comprises the step of generating a pulse signal having a 70-millisecond time duration.

\* \* \* \* \*